United States Patent
Ho

(10) Patent No.: US 9,977,942 B2
(45) Date of Patent: May 22, 2018

(54) SENSING APPARATUS FOR DETECTING USER TOUCH

(71) Applicant: MStar Semiconductor, Inc., Hsinchu Hsien (TW)

(72) Inventor: Kai-Ting Ho, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 27 days.

(21) Appl. No.: 15/146,000

(22) Filed: May 4, 2016

(65) Prior Publication Data

US 2016/0328593 A1 Nov. 10, 2016

(30) Foreign Application Priority Data

May 5, 2015 (TW) .............................. 104114240 A

(51) Int. Cl.
*G06K 9/00* (2006.01)
*G06F 3/041* (2006.01)

(52) U.S. Cl.
CPC .................................. *G06K 9/0002* (2013.01)

(58) Field of Classification Search
CPC ............ G06K 9/0002; H01L 27/14609; H01L 27/14692; H01L 21/707; H01L 27/3262
See application file for complete search history.

(56) References Cited

U.S. PATENT DOCUMENTS

| 5,325,442 | A | * | 6/1994 | Knapp | G01B 7/004 361/278 |
| 5,410,513 | A | * | 4/1995 | Masuda | G11C 8/04 365/233.1 |
| 2001/0033254 | A1 | * | 10/2001 | Furusato | G06F 3/0414 345/55 |
| 2011/0007019 | A1 | * | 1/2011 | Tasher | G06F 3/0416 345/174 |
| 2015/0097583 | A1 | * | 4/2015 | Gao | G01R 1/30 324/679 |

FOREIGN PATENT DOCUMENTS

TW   I390452 A   3/2013

* cited by examiner

*Primary Examiner* — David F Dunphy
(74) *Attorney, Agent, or Firm* — Edell, Shapiro & Finnan, LLC

(57) ABSTRACT

A sensing apparatus includes a substrate, N groups of sensing elements formed on the substrate, a sensing circuit and a switch control circuit. Each group of the N groups of sensing elements includes a plurality of sensing elements. Each of the sensing elements includes a thin-film transistor (TFT) switch and a sensing electrode. The sensing electrode drives the N groups of sensing elements to sequentially generate N groups of sensing signals. By controlling the TFT switches, the switch control circuit controls a plurality of sensing electrodes included in one group of the N groups of sensing elements to be coupled to the sensing circuit.

12 Claims, 6 Drawing Sheets

SENSING APPARATUS FOR DETECTING USER TOUCH

This application claims the benefit of Taiwan application Serial No. 104114240, filed May 5, 2015, the subject matter of which is incorporated herein by reference.

BACKGROUND OF THE INVENTION

Field of the Invention

The invention relates to a sensing apparatus for detecting a user touch.

Description of the Related Art

To increase data security, many electronic products provide fingerprint recognition in the recent years. A most typical fingerprint recognition device includes a sensing region having an area of approximately 1 $cm^2$ for a user to press a fingertip thereon. Below the sensing region are multiple sensing elements in a matrix arrangement. To adapt to gaps between two friction ridges, at least 100*100 (i.e., approximately 10000) sensing elements need to be provided in order to provide a sufficient sensing resolution. If self-capacitive sensing elements are adopted, sensing circuits in the same number as the sensing elements are usually provided in the fingerprint recognition device to respectively drive these sensing elements and receive signals generated by these sensing elements. As the friction ridges and the gaps between the friction ridges pose different levels of influence on the sensing elements, a backend controller is able to determine a fingerprint pattern according to values of signals outputted from the sensing circuits. The above sensing circuit is generally implemented by an integrated circuit. Generally known to one person skilled in the art, the cost of an integrated circuit is directly proportional to the area of a chip. One drawback of such typical fingerprint recognition device is that, in order to coordinate with the size of the sensing region and to accomplish a sufficient sensing resolution, the number of sensing circuits involved is massive, hence resulting in a huge load on hardware costs.

For reducing hardware costs, one kind of conventional fingerprint recognition utilizes a sensing region having a smaller area to reduce the numbers of sensing elements and sensing circuits. A user is required to slide a fingertip on the sensing region to allow the sensing region to gradually scan different parts of the fingerprint. Although such fingerprint recognition device is cheaper, it offers lower ease of use. Further, the incapability of recognition or misjudgment of fingerprint patterns may occasionally occur if the user slides the fingertip at inappropriate speed.

In a typical fingerprint recognition device, each sensing element and the corresponding sensing circuit are connected by an independent connecting line, and so the number of connecting lines between the sensing region and backend circuits is inevitably enormous. As such, if the sensing elements and the backend circuits are packaged in different hardware circuits, these two circuits are forced with huge numbers of external pins due to the enormous number of connecting lines in between, again leading to increased hardware costs. Thus, the sensing region and backend circuits are currently designed to be packaged in the same hardware circuit. However, such unavoidable packaging method limits the flexibility of hardware configuration and fabrication process selection to a certain extent.

SUMMARY OF THE INVENTION

The invention is directed to a sensing apparatus, a fingerprint scanning apparatus and a fingerprint scanning method. The same group of circuits is adopted to receive signals generated by different sensing elements in turn, thereby reducing the number of backend circuits as well as hardware costs of a fingerprint recognition device. The sensing apparatus of the present invention need not reduce the number of sensing elements nor the area of a sensing region, and is capable of preventing inconveniences caused by a small-area sensing region of the prior art. Further, the sensing circuits of the present invention may be connected to the sensing elements and backend circuits using a smaller number of connecting lines. Therefore, the present invention is further capable of increasing the possibility of packaging the sensing elements and the backend circuits in different hardware circuits as well as the flexibility of hardware configuration.

According to an embodiment the present invention, a sensing apparatus is provided. The sensing apparatus includes a substrate, N groups of sensing elements formed on the substrate (where N is an integer greater than 1), a sensing circuit and a switch control circuit. Each group of the N groups of sensing elements includes a plurality of sensing elements. Each of the sensing elements includes a thin-film transistor (TFT) switch and a sensing electrode. The sensing circuit drives each group of the N groups of sensing elements to sequentially generate N groups of sensing signals. The switch control circuit is electrically coupled to the plurality of TFT switches in the N groups of sensing elements. By controlling the TFT switches, the switch control circuit causes the plurality of sensing electrodes included each group of the N groups of sensing elements to be coupled to the sensing circuit at a time.

A fingerprint scanning apparatus for coordinating with N groups of sensing elements (where N is an integer greater than 1) is provided according to an embodiment of the present invention. Each group of the N groups of sensing elements includes a plurality of sensing elements. Each of the sensing elements includes a TFT switch and a sensing electrode. The fingerprint scanning apparatus includes a sensing circuit and a switch control circuit. The sensing circuit drives the N groups of sensing elements to sequentially generate N groups of sensing signals. The switch control circuit is electrically coupled to the plurality of TFT switches in the N groups of sensing elements. By controlling the TFT switches, the switch control circuit causes the plurality of sensing electrodes included in each group of the N groups of sensing elements to be coupled to the sensing circuit at a time. A physical position distribution of the N groups of sensing signals corresponding to the plurality of sensing electrodes is used to determine a fingerprint pattern.

A fingerprint scanning method for coordinating with a sensing circuit and N groups of sensing elements (where N is an integer greater than 1) is provided according to an embodiment of the present invention. Each group of the N groups of sensing elements includes a plurality of sensing elements. Each of the sensing elements includes a TFT switch and a sensing electrode. The fingerprint scanning method includes: a) controlling the sensing circuit to drive the N groups of sensing elements to sequentially generate N groups of sensing signals; b) controlling the TFT switches to cause the plurality of sensing electrodes included in each group of the N group of sensing elements to be coupled to the sensing circuit at a time; and c) determining a fingerprint pattern according to a physical position distribution of the N groups of sensing signals corresponding to the plurality sensing electrodes.

The above and other aspects of the invention will become better understood with regard to the following detailed description of the preferred but non-limiting embodiments. The following description is made with reference to the accompanying drawings.

Figure 1A:
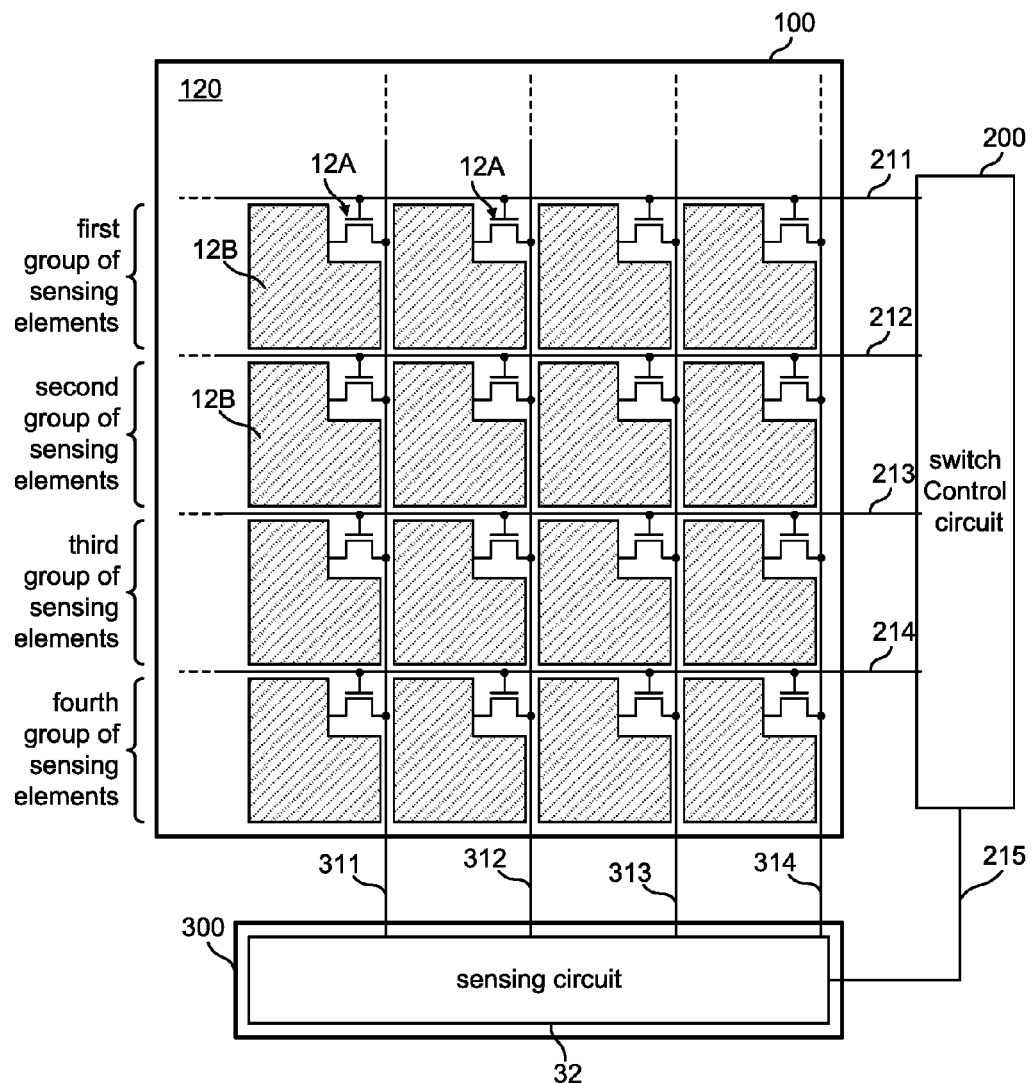
FIG. 1(A) is a function block diagram of a sensing apparatus according to an embodiment of the present invention.

It should be noted that, the drawings of the present invention include functional block diagrams of multiple functional circuits related to one another. These drawings are not detailed circuit diagrams, and connection lines therein are for indicating signal flows only. The interactions between the functional elements and/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

FIG. 1(A) shows a function block diagram of a sensing apparatus according to an embodiment of the present invention. The sensing apparatus includes a substrate 100, a switch control circuit 200, and an integrated circuit 300. In practice, the sensing apparatus may be an independent unit, or may be integrated into an electronic product that requires a touch sensing function for a user touch, such as a mobile phone, a laptop computer and a tablet computer. It should be noted that, for example but not limited to, the sensing apparatus of the present invention may be utilized for fingerprint recognition.

A thin-film transistor (TFT) structure 120 is formed on the substrate 100. The structure includes a plurality of TFT switches 12A and a plurality of sensing electrodes 12B (the shaded parts). In practice, the sensing electrodes 12B may be realized by a metal layer or a metal alloy layer in the TFT structure 120. Each of the sensing electrodes 12B correspond to one of the TFT switches 12A to jointly form a sensing element. For example, the TFT structure 120 may be designed to include 100*100 sensing elements in a matrix arrangement. The size, number and arrangement method of the sensing elements may be determined by a circuit manufacturer according to the size of a sensing region and a required precision. To keep the drawing simple and easy to read, FIG. 1(A) depicts only 4*4 sensing elements as an example for illustration purposes. According to the present invention, the sensing elements are divided into N groups (where N is an integer greater than 1). Each group of the N groups of sensing elements includes a plurality of sensing elements. In this embodiment, the sensing elements located in the same horizontal row are defined as the same group of sensing elements. As shown by the example in FIG. 1(A), a first group to a fourth group of sensing elements are sequentially arranged from top to bottom. It should be noted that, each group of sensing elements may include more than one horizontal row of sensing elements, and may also be a plurality of adjacent or separated rows of sensing elements.

The switch control circuit 200 is electrically coupled to the TFT switches 12A (to be referred to as control switches), and controls the control switches 12A to be turned on or turned off. In this embodiment, the control switches 12A included in the same group of sensing elements are coupled to the same control line, and so the switch control circuit 200 is electrically coupled to the control switches 12A via a total number of N control lines. As shown in FIG. 1(A), the control switches 12A in the first group of sensing elements are electrically coupled to the switch control circuit 200 via a control line 211, the control switches 12A in the second group of sensing elements are electrically coupled to the switch control circuit 200 via a control line 212, and so forth.

The integrated circuit 300 is disposed near the substrate 100, and includes a sensing circuit 32 that is selectively electrically coupled to the sensing electrodes 12B. It is seen from FIG. 1(A) that, when one of the control switches 12A is controlled to be turned on by the switch control circuit 200, the sensing electrode 12B corresponding to that control switch 12A is electrically coupled to the sensing circuit 32 via a receiving conductive line. For example, when the switch control circuit 200 provides a control signal (e.g., a high-level signal) through a control line 213, the control switches 12A in the third group of sensing elements are set to be turned on, and the sensing electrodes 12B in the third group of sensing elements are electrically coupled to the sensing circuit 32 via the control switches 12A and receiving conductive lines 311 to 314. By controlling the control switches 12A, the switch control circuit 200 causes the sensing electrodes 12B included in one group of the N groups of sensing elements to be coupled to the sensing circuit 32 at a time. That is to say, only the sensing electrodes 12B of one group of sensing elements are coupled to the sensing circuit 32 each time.

When one group of sensing elements are coupled to the sensing circuit 32, the sensing circuit 32 first drives that group of sensing elements in a continuous period, and receives signals generated by that group of sensing units before such coupling relationship ends. When the switch control circuit 200 sequentially couples the N groups of sensing elements to the sensing circuit 32, the sensing circuit 32 is allowed to sequentially drive the sensing elements and sequentially receive the signals generated by these groups of sensing units.

The switch control circuit 200 and the sensing circuit 32 are connected by a conductive line 215. In one embodiment, from the information provided by the switch control circuit 200, the sensing circuit 32 learns which group of sensing elements is coupled to the sensing circuit 32. In another embodiment, which group of sensing elements is controlled to be coupled to the sensing circuit 32 by the switch control circuit 200 is determined by the sensing circuit 32. In yet another embodiment, the orders according to which the switch control circuit 200 switches the sensing elements are fixed and periodical, and the switching method is known in advance to the sensing circuit 32. In the above situation, given that the switch control circuit 200 and the sensing circuit 32 are synchronized with the information of the starting group, the sensing circuit 32 need not constantly exchange switching information with the switch control circuit 200.

As previously described, the distance between a user touch and sensing elements generates different levels of influence on the sensing elements. Given that a period by which the switch control circuit 200 switches the groups of sensing element in turn is short enough (compared to the speed in the change of a user action), the sensing circuit 32 may completely render a pattern of a user touch (e.g., a fingerprint pattern) according to the signals generated by the N groups of sensing elements.

Figure 1B:
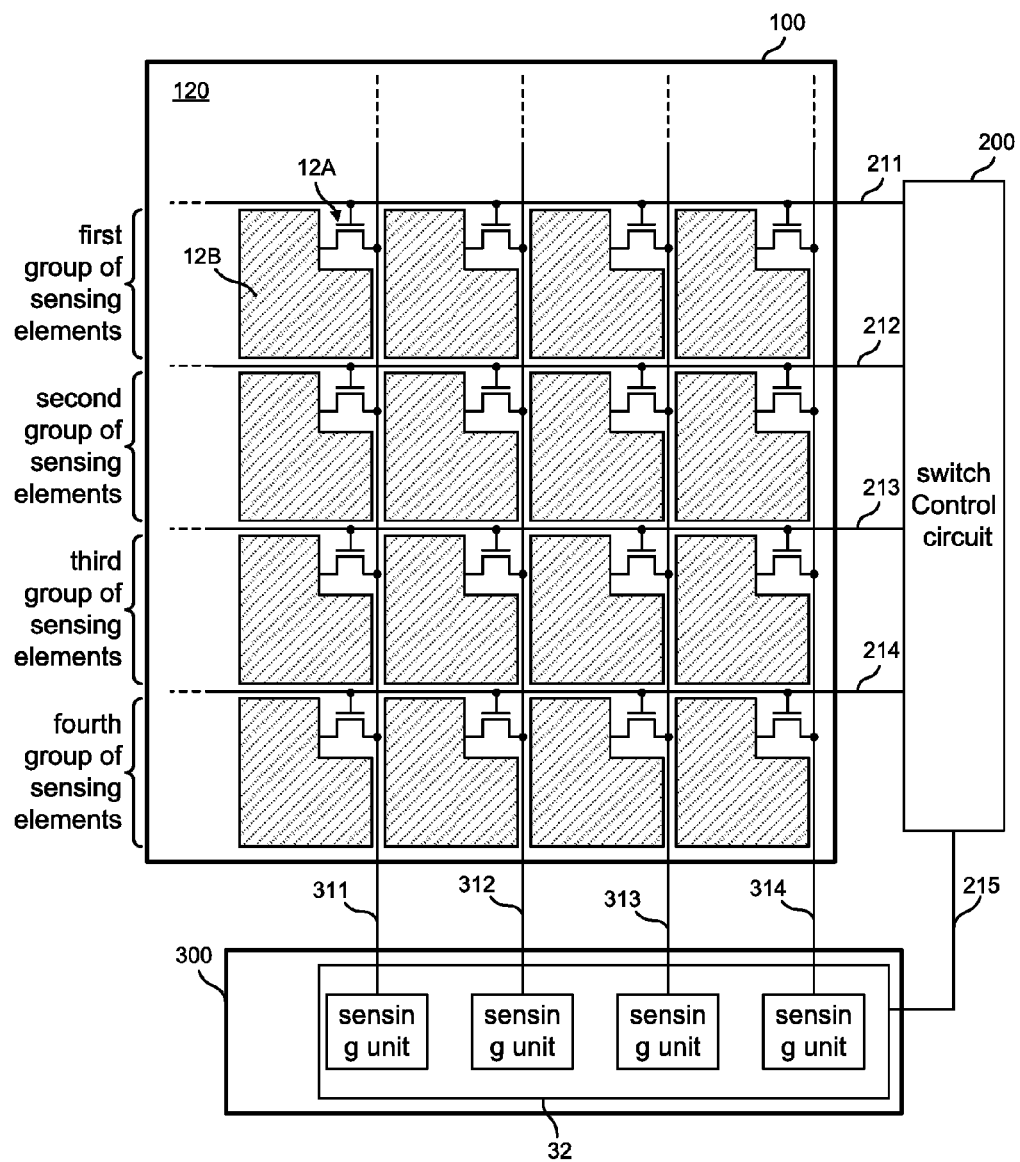
FIG. 1(B) is a schematic diagram of a corresponding relationship of sensing units and sensing elements according to an embodiment of the present invention.

Assuming that each group of sensing elements includes M sensing elements (where M is an integer greater than 1), the sensing circuit 32 may include M sensing units each corresponding to one sensing element. FIG. 1(B) shows a schematic diagram of such corresponding relationship. Accordingly, by receiving the signals generated by the N groups of sensing elements using the M sensing units in turn, the sensing of M*N sensing elements can be achieved. Therefore, without reducing the number of sensing elements or the area of the sensing region, the present invention effectively reduces the number of sensing circuits and hence the hardware costs of a fingerprint recognition device.

In practice, the switch control circuit 200 may be integrated into the TFT structure 120 and realized by a TFT, or may be integrated in the integrated circuit 200 where the sensing circuit 32 is located. For example, the switch control circuit 200 may be implemented as a fixed and/or programmable digital logic circuit, for example but not limited to, including a programmable logic gate array, an application-specific integrated circuit (ASIC), a microcontroller, a microprocessor, and a digital signal processor (DSP).

It should be noted that, when the switch control circuit 200 shown in FIG. 1(A) is integrated in the TFT structure 120, only M receiving conductive lines (311 to 314) and the conductive line 215 are required between the integrated circuit 300 and the substrate 100. When the switch control circuit 200 shown in FIG. 1(A) is integrated in the integrated circuit 300, only M receiving conductive lines (311 to 314) and N control lines (211 to 214) are required between the integrated circuit 300 and the substrate 100. Compared to a conventional solution that requires M*N connecting lines, the sensing apparatus of the present invention significantly reduces the number of required connecting lines, thereby increasing the possibility of packaging the sensing elements and the backend circuits into different hardware circuits as well as the flexibility of hardware configuration. One person skilled in the art can understand that, by reducing the number of connecting lines between the N groups of sensing elements and other circuits, the routing area occupied on the substrate can be decreased, which helps reduce the border width of electronic products in many cases.

Figure 2A:
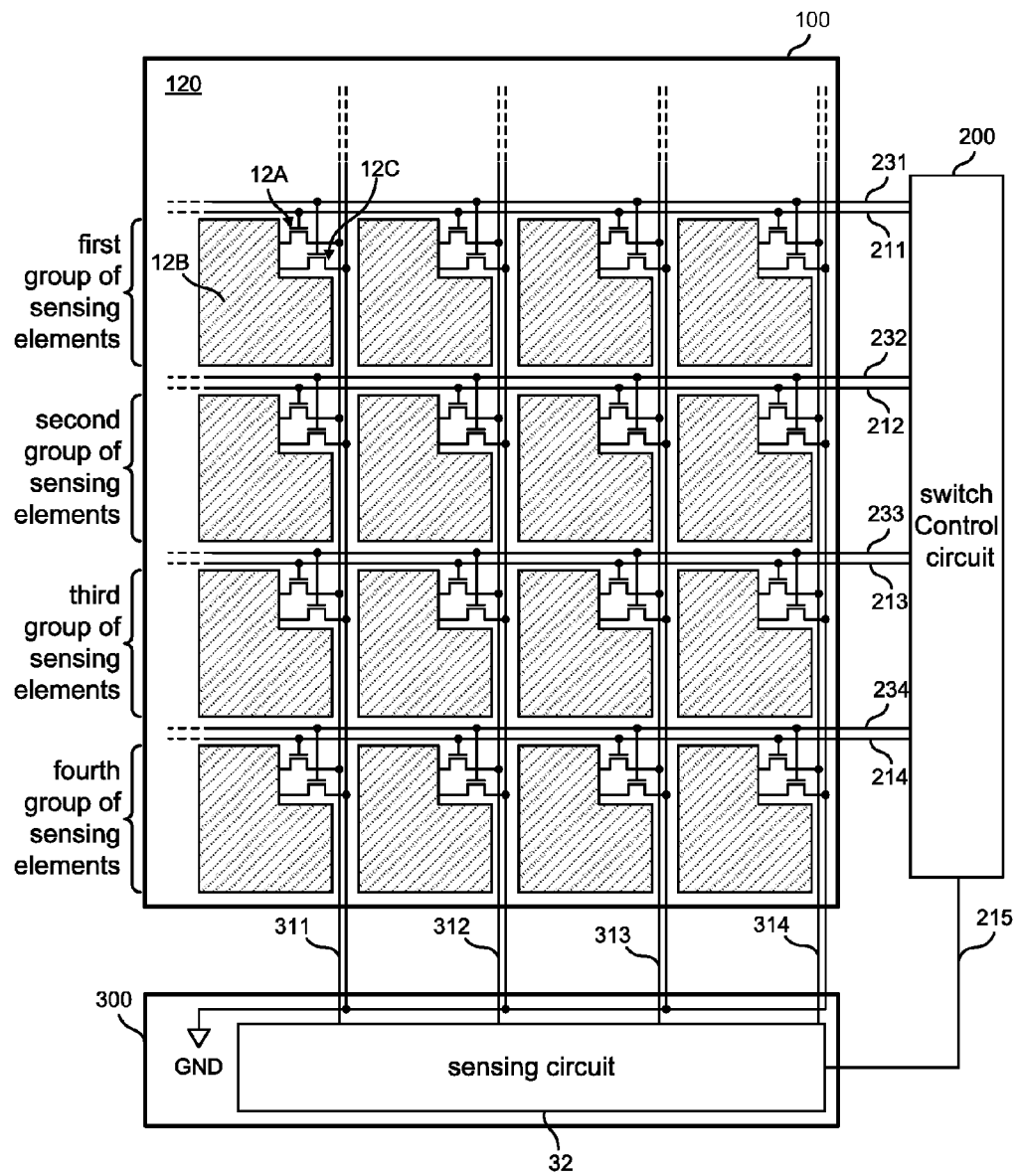
FIG. 2(A) and FIG. 2(B) are function block diagrams of a sensing apparatus according to another embodiment of the present invention.

Referring to FIG. 2(A), in another embodiment, the TFT structure 120 further includes a plurality of TFT switches 12C (to be referred to as protection switches) controlled by the switch control circuit 200. Each of the sensing elements is provided with a protection switch 12C. In this embodiment, the protection switches 12C included in the same group of sensing elements are coupled to the switch control circuit 200 via the same protection conductive line, and so the switch control circuit 200 is electrically coupled to the protection switches 12C via a total number of N protection conductive lines. As shown in FIG. 2(A), the protection switches 12C in the first group of sensing elements are electrically coupled to the switch control circuit 200 via a control line 231, the protection switches 12C in the second group of sensing elements are electrically coupled to the switch control circuit 200 via a control line 232, and so forth. It is seen from FIG. 2(A) that, when one protection switch 12C is controlled to be turned on by the switch control circuit 200, the sensing electrode 12B corresponding to that protection switch 12C is electrically coupled to a ground terminal GND in the integrated circuit 300 via a conductive line. For each of the sensing elements, the switch control circuit 200 causes only one of the control switch 12A and the protection switch 12C to be turned on at a time. By controlling the protection switches 12C, the switch control circuit 200 may provide a fixed voltage (not necessarily the ground voltage) to the sensing electrodes 12B in the sensing elements that are not coupled to the sensing circuit 32, so as to mitigate the interference the sensing elements that are not coupled to the sensing circuit 32 generate on the detection result of the sensing circuit 32.

Figure 2B:
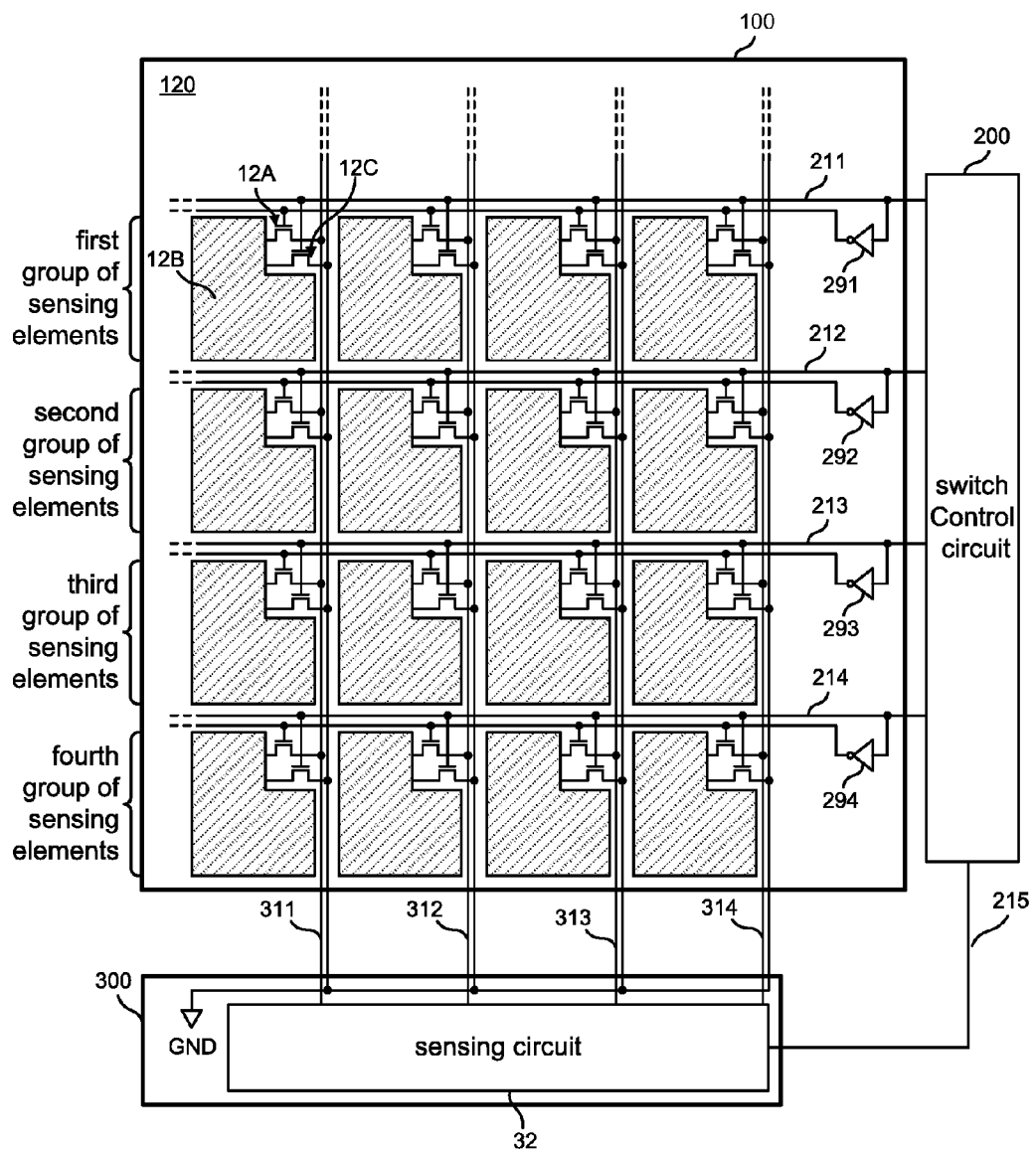

Assuming that the control switches 12A and the protection switches 12C are controlled to be turned on by a voltage at a same level (e.g., both are turned on when the switch control circuit 200 provides a high-level voltage), connections among the switch control circuit 200, the control switches 12A and the protection switches 12C may be modified to those shown in FIG. 2(B). That is, inverters 291 to 294 in the TFT structure 120 are used to generate control signals provided to the protection switches 12C. As such, compared to the circuit configuration in FIG. 2(A), the number of conductive lines between the substrate 100 and the switch control circuit 200 may be reduced by half, thereby further reducing the number of conductive lines while achieving a protection effect.

Figure 3:
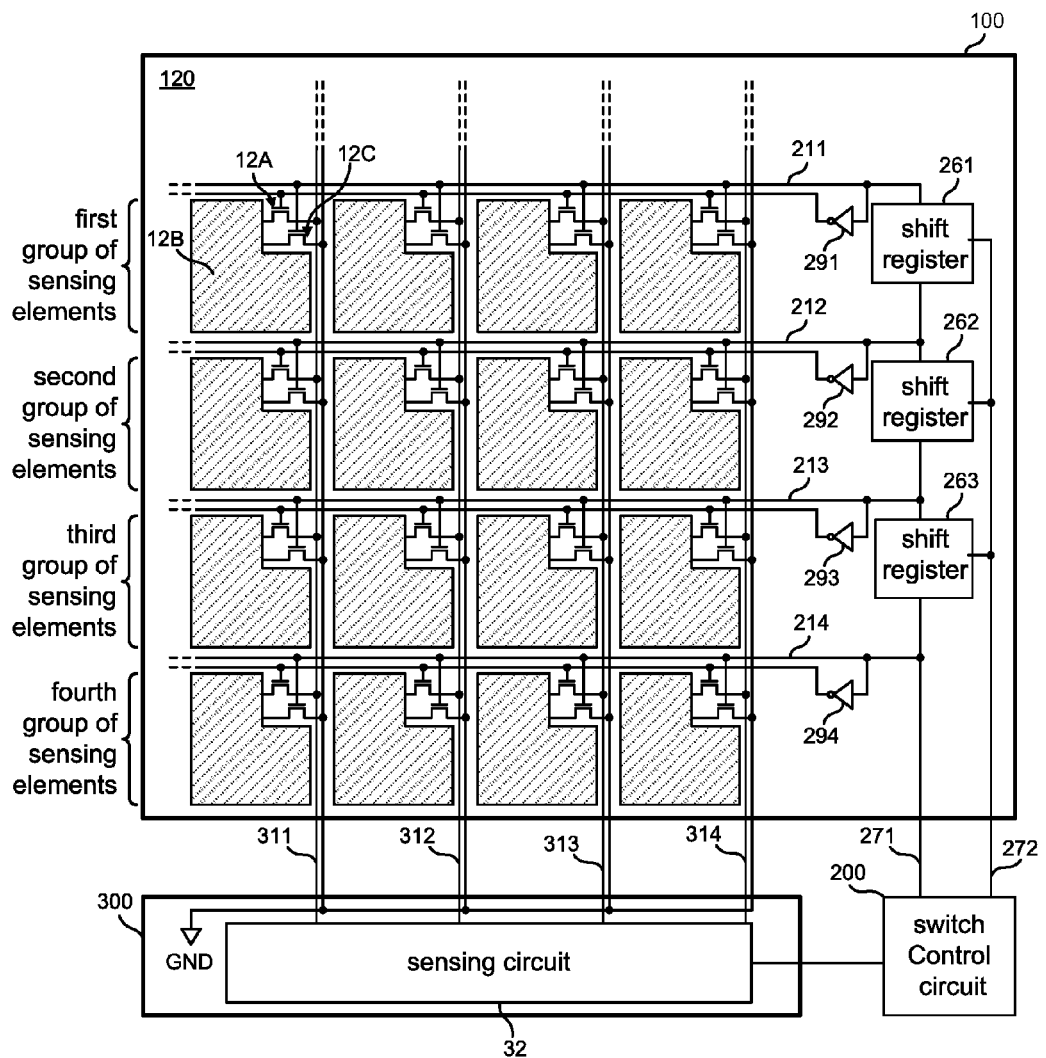
FIG. 3 is a function block diagram of a sensing apparatus according to another embodiment of the present invention.

Referring to FIG. 3, in another embodiment, the TFT structure 120 further includes (N−1) shift registers (e.g., shift registers 261 to 263). Except for the fourth group of sensing elements, each of the other three groups of sensing elements corresponds to one shift register. The shift registers 261 to 263 receive the same clock signal from the switch control circuit 200 via a clock signal line 272, and regard the clock signal as an operation basis for state change. Assume that all of the control switches 12A and protection switches 12C are turned on when the switch control circuit 200 provides a high-level voltage, an initial stage of output signals of the shift registers 261 to 263 is a low-level voltage. In a first period of the clock signal, the switch control circuit 200 provides a high-level pulse (also referred to as an activating pulse) to the control signal line 271 to cause the fourth group of sensing elements to be coupled to the sensing circuit 32. In the second period, the switch control circuit 200 changes the voltage provided to the control signal line 271 to a low level to stop coupling the fourth group of sensing elements to the sensing circuit 32. Meanwhile, through the shift register 263, the high-level pulse causes the third group of sensing elements to be coupled to the sensing circuit 32, and so forth. As such, the fourth group of sensing elements, the third group of sensing elements, the second group of sensing elements and the first group of sensing elements are sequentially coupled to the sensing circuit 32. In other words, the switch control circuit 200 only needs to provide the activating pulse to the first shift register, which then sequentially transmits the activating pulse to the next shift register according to the clock signal to couple the group of sensing elements corresponding to the next shift register to the sensing circuit 32. One advantage of such approach is that, the number of conductive lines between the substrate 100 and the switch control circuit 200 may be further reduced to only one control signal line 271 and one clock signal line 272.

A fingerprint scanning apparatus for coordinating with N groups of sensing elements (where N is an integer greater than 1) is provided according to an embodiment of the present invention. Each group of the N groups of sensing elements includes a plurality of sensing elements. Each of the sensing elements includes a TFT switch and a sensing electrode. The function block diagram of the fingerprint scanning apparatus is similar to the sensing apparatuses shown in FIG. 1(A) to FIG. 3, and shall be omitted in the application. The fingerprint scanning apparatus includes a sensing circuit and a switch control circuit. The sensing circuit drives the N groups of sensing elements to sequentially generate N groups of sensing signals. The switch control circuit is electrically coupled to the plurality of TFT switches in the N groups of sensing elements. By controlling the TFT switches, the switch control circuit causes the plurality of sensing electrodes included in one group of the N groups of sensing elements to be coupled to the sensing circuit at a time.

According to a physical position distribution of the N groups of sensing signals corresponding to the plurality of sensing electrodes, a fingerprint pattern can be determined. It should be noted that, the physical position distribution of the sensing elements is known in advance to the sensing circuit. Taking the four groups of sensing elements in FIG. 1(A) for example, the sensing circuit in the fingerprint scanning apparatus of the present invention may correlate each group of the sensing signals to one horizontal scan line. The color of the horizontal scan line gets darker as the number of dots in the horizontal scan line touched by the friction ridges increases. One person skilled in the art can understand that, operation details and variations (e.g., adding the protection switches or shift registers) in the description associated with the sensing apparatuses in FIG. 1(A) to FIG. 3 can be applied to the fingerprint scanning apparatus, and shall be omitted herein.

A fingerprint scanning method for coordinating with a sensing circuit and N groups of sensing elements (where N is an integer greater than 1) is provided according to another embodiment of the present invention. Each group of the N groups of sensing elements includes a plurality of sensing elements. Each of the sensing elements includes a TFT switch and a sensing electrode. The fingerprint scanning method includes: a) controlling the sensing circuit to drive the N groups of sensing elements to sequentially generate N groups of sensing signals; b) controlling the TFT switches to cause the plurality of sensing electrodes included in one group of the N groups of sensing elements to be coupled to the sensing circuit at a time; and c) determining a fingerprint pattern according to a physical position distribution of the N groups of sensing signals corresponding to the plurality of sensing electrodes.

Figure 4:
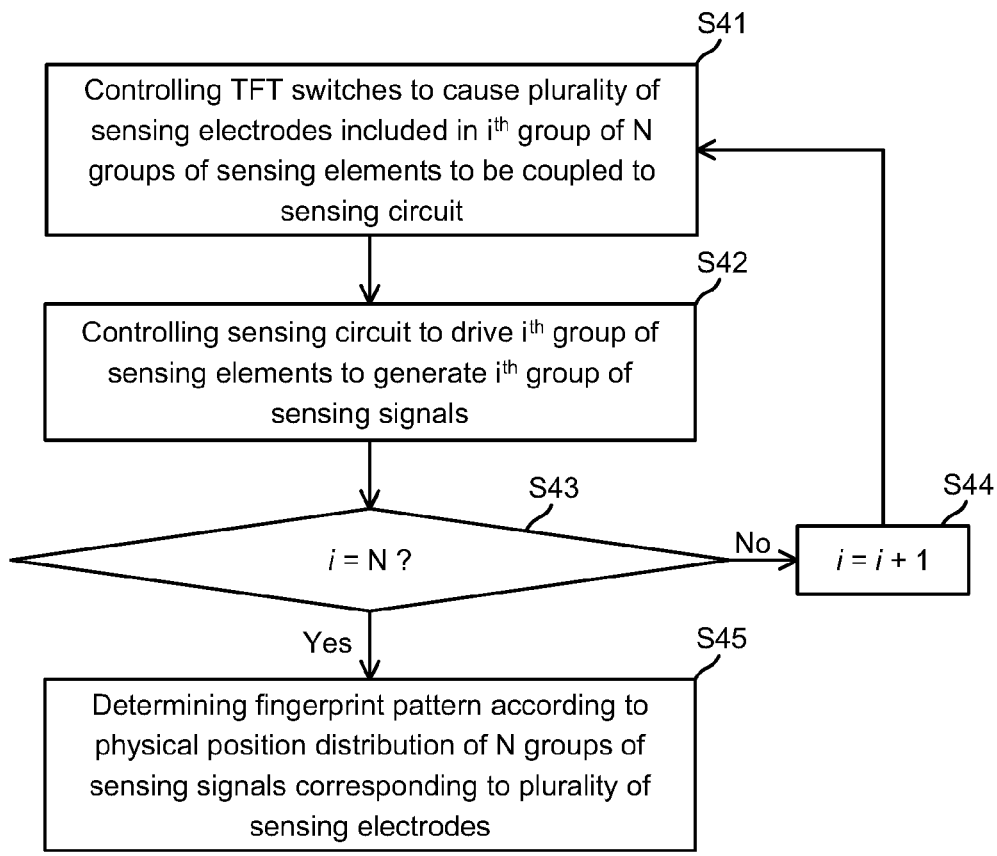
FIG. 4 is a flowchart of a fingerprint scanning method according to an embodiment of the present invention.

FIG. 4 shows an exemplary flowchart applying the above method. In step S41, the TFT switches are controlled to cause the plurality of sensing electrodes included in an $i^{th}$ group of the N groups of sensing elements to be coupled to the sensing circuit (where i is an integral index between 1 and N). In step S42, the sensing circuit is controlled to drive the $i^{th}$ group of sensing elements to generate an $i^{th}$ group of the sensing signals. In step S43, it is determined whether the current integral index i is equal to N. Step S44 is performed if the determination result of step S43 is negative to add the integral index by 1. Step S45 is performed if the determination result of step S43 is affirmative to determine a fingerprint pattern according to a physical position distribution of the N groups of sensing signals corresponding to the plurality of sensing electrodes.

One person skilled in the art can understand that, operation details and variations (e.g., adding the protection switches or shift registers) in the description associated with the sensing apparatuses in FIG. 1(A) to FIG. 3 can be applied to the fingerprint scanning method, and shall be omitted herein.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sensing apparatus, comprising:
   a substrate;
   N groups of sensing elements, formed on the substrate, each group of the N groups of sensing elements comprising a plurality of sensing elements, each of the sensing elements comprising a thin-film transistor (TFT) switch and a sensing electrode, N being an integer greater than 1;
   a sensing circuit, driving each group of the N groups of sensing elements to sequentially generate N groups of sensing signals; and
   a switch control circuit, electrically coupled to the TFT switches in the N groups of sensing elements to control the TFT switches, causing a plurality of sensing electrodes included in one group of the N groups of sensing elements to be coupled to the sensing circuit,
   wherein each of the sensing elements further comprises a respective protection switch, and the switch control circuit controls the respective protection switches to cause a fixed voltage to be provided to the sensing electrodes in the sensing elements that are not coupled to the sensing circuit.

2. The sensing apparatus according to claim 1, wherein the plurality of sensing electrodes are realized by a metal layer or a metal alloy layer in a TFT structure.

3. The sensing apparatus according to claim 1, wherein the switch control circuit is electrically coupled to the plurality of TFT switches via N control lines, and the TFT switches included in the same group of sensing elements are coupled to the same control line.

4. The sensing apparatus according to claim 1, wherein the N groups of sensing elements comprise M*N sensing elements, each group of sensing elements comprises M sensing elements, where M is an integer greater than 1; the sensing circuit comprises M sensing units each corresponding to one sensing element.

5. The sensing apparatus according to claim 1, wherein on the substrate are further disposed (N−1) shift registers connected in series, an $i^{th}$ shift register of the (N−1) shift registers is coupled to the plurality of TFT switches included in an $i^{th}$ group of the N groups of sensing elements, the (N−1) shift registers are controlled by a clock signal provided by the switch control circuit, the switch control circuit provides an activating pulse to one of the shift registers, and the (N−1) shift registers sequentially transmit the activating pulse to the next shift register according to the clock signal; the shift register that receives the activating pulse sets the plurality of TFT switches coupled to the shift register to be turned on.

6. A fingerprint scanning apparatus, for coordinating with N groups of sensing elements, each group of the N groups of sensing elements comprising a plurality of sensing elements, each of the sensing elements comprising a thin-film transistor (TFT) switch and a sensing electrode, N being an integer greater than 1, the fingerprint scanning apparatus comprising:

a sensing circuit, driving the N groups of sensing elements to sequentially generate N groups of sensing signals; and a switch control circuit, electrically coupled to the plurality of TFT switches in the N groups of sensing elements to control the TFT transistors, causing a plurality of sensing electrodes included in one group of the N groups of sensing elements to be electrically coupled to the sensing circuit;

wherein a physical position distribution of the N groups of sensing signals corresponding to the plurality of sensing electrodes is used to determine a fingerprint pattern, and wherein each of the sensing elements further comprises a respective protection switch, and the switch control circuit controls the respective protection switches to cause a fixed voltage to be provided to the sensing electrodes in the sensing elements that are not coupled to the sensing circuit.

7. The fingerprint scanning apparatus according to claim 6, wherein the switch control circuit is electrically coupled to the plurality of TFT switches via N control lines, and the TFT switches included in the same group of sensing elements are coupled to the same control line.

8. The fingerprint scanning apparatus according to claim 6, wherein the N groups of sensing elements comprise M*N sensing elements, each group of sensing elements comprises M sensing elements, where M is an integer greater than 1; the sensing circuit comprises M sensing units each corresponding to one sensing element.

9. The fingerprint scanning apparatus according to claim 6, further comprising (N−1) shift registers connected in series, wherein an $i^{th}$ shift register of the (N−1) shift registers is coupled to the plurality of TFT switches included in an $i^{th}$ group of the N groups of sensing elements, the (N−1) shift registers are controlled by a clock signal provided by the switch control circuit, the switch control circuit provides an activating pulse to one of the shift registers, and the (N−1) shift registers sequentially transmit the activating pulse to the next shift register according to the clock signal; the shift register that receives the activating pulse sets the plurality of TFT switches coupled to the shift register to be turned on.

10. A fingerprint scanning method, for coordinating with a sensing circuit and N groups of sensing elements, each group of the N groups of sensing elements comprising a plurality of sensing elements, each of the sensing elements comprising a thin-film transistor (TFT) switch and a sensing electrode, N being an integer greater than 1, the fingerprint scanning method comprising:

controlling the sensing circuit to drive the N groups of sensing elements to sequentially generate N groups of sensing signals;

controlling the TFT switches to cause a plurality of sensing electrodes included in one group of the N groups of sensing elements to be coupled to the sensing circuit; and determining a fingerprint pattern according to a physical position distribution of the N groups of sensing signals corresponding to the plurality of sensing electrodes, wherein each of the sensing elements further comprises a respective protection switch, the fingerprint scanning method further comprising:

controlling the respective protection switches to cause a fixed voltage to be provided to the sensing electrodes in the sensing elements that are not coupled to the sensing circuit.

11. The fingerprint scanning method according to claim 10, wherein the N groups of sensing elements comprise M*N sensing elements, each group of sensing elements comprises M sensing elements, where M is an integer greater than 1; the sensing circuit comprises M sensing units each corresponding to one sensing element.

12. The fingerprint scanning method according to claim 10, wherein an $i^{th}$ shift register of (N−1) shift registers connected in series is coupled to the plurality of TFT switches included in an $i^{th}$ group of the N groups of sensing elements, the fingerprint scanning method further comprising:

providing a clock signal to control the (N−1) shift registers; and providing an activating pulse to one of the shift registers, and causing the (N−1) shift registers to transmit the activating pulse to the next shift register according to the clock signal;

wherein, after the activating pulse is received, the one shift register sets the plurality of TFT switches coupled to the one shift register to be turned on.

* * * * *